United States Patent
Biliris et al.

Patent Number: 6,041,354
Date of Patent: Mar. 21, 2000

[54] DYNAMIC HIERARCHICAL NETWORK RESOURCE SCHEDULING FOR CONTINUOUS MEDIA

[75] Inventors: Alexandros Biliris, Chatham; Bruce K. Hillyer, Colts Neck; Euthimios Panagos, Plainfield, all of N.J.

[73] Assignee: Lucent Technologies Inc., Murray Hill, N.J.

[21] Appl. No.: 08/525,937

[22] Filed: Sep. 8, 1995

[51] Int. Cl.[7] ................................................ G06F 13/14
[52] U.S. Cl. .......................... 709/226; 709/231; 709/204
[58] Field of Search .............................. 395/673, 200.61, 395/200.34, 200.56

[56] References Cited

U.S. PATENT DOCUMENTS

| | | | |
|---|---|---|---|
| 5,528,513 | 6/1996 | Vaitzblit et al. | 364/514 |
| 5,532,937 | 7/1996 | Graziano et al. | 395/200.34 |
| 5,633,859 | 5/1997 | Jain et al. | 370/234 |
| 5,659,790 | 8/1997 | Kim et al. | 395/806 |
| 5,708,796 | 1/1998 | Ozden et al. | 395/494 |

OTHER PUBLICATIONS

T.D.C. Little and D. Venkatesh, Client–Server Metadata Management for the Delivery of Movies in a Video–on–Demand System, IEEE Conference Paper, pp11–18, Jun. 27, 1994.

Deepak R. Kenchammana–Hosekote and Jaideep Srivastava, "Scheduling Continuous Media in a Video–on–Demand Server", IEEE Conference Paper, pp19–28, May 15, 1994.

A.L. Narasimha Redda and James C. Wyllie, "I/O Issues in a Multimedia System", Computer, pp69–74, Mar. 1994.

D.P. Anderson "Metascheduling For Continuous Media" ACM Transactions On Computer Systems, Aug. 1993, pp. 226–252.

D.P. Anderson et al. "A File System For Continuous Media" ACM Transactions on Computer Systems Nov. 1992, pp. 311–337.

S.T.C. Chou et al. "System Support For Dynamic Qos Control of Continuous Media Communication" Nov. 1992, pp. 363–368.

E. Chang et al. "Scalable Video Placement On Parallel Disk Arrays" Feb. 1994, pub. as SPIE Proc. Series vol. 2185, SPIE, Bellingham WA.

R.I. Davis et al. "Scheduling Slack Time In Fixed Priority Pre–emptive Systems" Dec. 1993, pp. 222–231.

J.Y. Hui et al. "Grams: A Distributed Multimedia Service System" Feb. 1994, pp. 189–199.

S. Jamin et al. "An Admission Control Algorithm For Predictive Real–Time Service" Nov. 1992, pp. 349–356.

P. Lougher et al. "The Design Of A Storage Server For Continuous Media" 1993, pp. 32–42.

D. Niehaus et al. "The Spring Scheduling Co–Processor: Design, Use and Performance" Dec. 1993, pp. 106–111.

K. Schwan et al. "Dynamic Scheduling Of Hard Real–Time Tasks and Real–Time Threads" Aug. 1992, pp. 736–748.

H.M. Vin et al. "Admission Control Algorithms For Multimedia On–Demand Servers" Nov. 1992, pp. 56–68.

G.A. Wall et al. "Bus Bandwidth Management In A High Resolusion Video Workstation" Nov. 1992, pp. 274–288.

*Primary Examiner*—Frank J. Asta
*Assistant Examiner*—Ivan C. Pierce, III

[57] ABSTRACT

An apparatus and method is provided that supports continuous media for conventional networked workstations and PC's. Described are user-level mechanisms and policies designed to give good, efficient multimedia service under the mild assumption that the operating system provides a preemptive real-time scheduling class that can be used to give CPU cycles to the multimedia processes in preference to other processes that are not time sensitive. There are no modifications to the operating system kernel and isochronous networks are not required. It suffices for an application to state that it wants to play a particular stream of a type known to the server (e.g. a file containing MPEG-1 video 320×240 pixels, 8-bit color, 30 frames per second), or for the application to specify a frame rate and an index describing the offset of each frame in a file.

16 Claims, 4 Drawing Sheets

DYNAMIC HIERARCHICAL NETWORK RESOURCE SCHEDULING FOR CONTINUOUS MEDIA

BACKGROUND OF THE INVENTION

1. Field of the Invention

This invention relates to resource scheduling and, more particularly, to dynamic hierarchial resource scheduling for continuous media based on initial conservative estimates and then slack filling.

2. Description of the Related Art

As loads increase on computers and workstations, smooth playout of continuous media streams have had greater difficulty in being maintained because of the computer's loss of Central Processor Unit (CPU) cycles and network and disk bandwidth, leading to delayed transfers. Demand has risen for continuous media service on networks of conventional workstations and personal computers running common operating systems that can handle more strenuous loads. But the normal mechanisms in this environment provide resource allocation with no allowance for time-sensitive behavior.

In order for media service to maintain a continuous stream of data, resources need to be managed to avoid shortages that would cause interruptions. In general, the most of the prior art has been geared toward hard, real-time scheduling. This approach requires an environment where every latency and resource requirement is known. See D. Niehaus, et al. The Spring Scheduling Co-Processor: Design, Use and Performance; In Proceedings Real-Time Systems Symposium Raleigh-Durham N.C., pgs. 106–111, December 1993; and K. Schwan et al., Dynamic Scheduling of Hard Real-Time Tasks and Real-Time Threads, IEEE Transactions on Software Engineering, 18(8): 736–748, August 1992. Hard real-time scheduling is computationally expensive, and is not normally possible in general timesharing environments characterized by unpredictable resources and delays.

A second common approach has been with conservative resource usage estimates. Admission control limits the service load to that known to be safe in the worst case, or known to be safe with high probability. See, for example, D. P. Anderson, Metascheduling for continuous media. ACM Transactions on Computer Systems, 11(3):226–252, August 1993 and D. P. Anderson et al.; a file system for continuous media; ACM Transactions on Computer Systems, 10(4): 311–337, 1992. However, conservative estimates lead to low utilization in a general operating system setting.

Admission control and resource scheduling can also be performed by a model of the resources available and the resource consumption demanded by a new request. As an example, see P. Loucher et al.; The Design Of A Storage Server For Continuous Media, The Computer Journal, 36(1): 2–42, 1993. One problem here is that a resource model of the system cannot be both highly accurate and inexpensively computed, particularly for general timesharing environments. Another problem is that the precise resource consumption implied by a new request for service is generally unknown.

The above approaches generally share the "admission control assumption", namely that a request for service should either be refused immediately, or should be guaranteed good service. To support the admission control assumption, the systems must place fairly strong requirements on the determinism and predictability of the system and workload.

SUMMARY OF THE INVENTION

The present invention provides a method for handling continuous media efficiently and with good service quality on conventional computers and operating systems, given a real-time scheduling priority such as in Sun's Solaris or Microsoft's Windows NT. The key elements of the method of the apparatus and method are to perform hierarchical resource scheduling based on conservative estimates of resource consumption, and based on dynamic monitoring of actual resource consumption, improve utilization by slack filling, protect the quality of service for the maximal number of important streams by focusing degradation during periods of resource insufficiency on the streams deemed least important according to some prioritization policy, and use application-specified policies to degrade streams, rather than a common server-specified policy.

Input/Output (I/O) requests are scheduled by the present invention to the operating system on the server so as to manage the bandwidth of the disks, disk controllers, memory subsystem, and network to get the needed multimedia frames to the clients in the right timeframes. If the network supports bandwidth reservation, the network portion of the scheduling reduces to simple admission and monitoring. The techniques for resource management in the client/server environment are also applicable to systems playing continuous media from local disks. The network scheduling is applicable to local area network (LAN) environments where the server send and client receive operations are closely coupled.

An alternative to the admission control assumption is provided that is suitable for a general application environment, such as UNIX workstations and PC's on networks, that may not support bandwidth reservation. A hierarchical resource scheduler based on simple conservative resource availability and consumption functions, identifies the initial set of transfers to be issued to the operating system at the beginning of each schedule cycle. A method for dynamic slack determination and filling observes actual resource consumption during a cycle and dynamically initiates additional transfers to improve utilization.

In an environment where the available resources cannot be characterized precisely, and the resource demands implied by client requests for continuous media service are not accurately known, the methods of the present invention give good service to the most important continuous media jobs, focusing resource insufficiency on the least important jobs. Most important is determined by an arbitrary prioritization policy that places a rank ordering on the jobs. This is the best that can be done without stronger assumptions on the predictability of the system and workload.

The focus of the invention is on playback of continuous media, e.g. audio and video. The recording of continuous media is not a time sensitive activity. A server having sufficient bandwidth to accommodate the stream can use buffering and delayed writes to handle recording of continuous media at its convenience.

BRIEF DESCRIPTION OF THE DRAWINGS

The features of the subject invention will become more readily apparent and may be better understood by referring to the following detailed description of an illustrative embodiment of the present invention, taken in conjunction with the accompanying drawings, where.

DETAILED DESCRIPTION OF PREFERRED EMBODIMENTS

Figure 1:
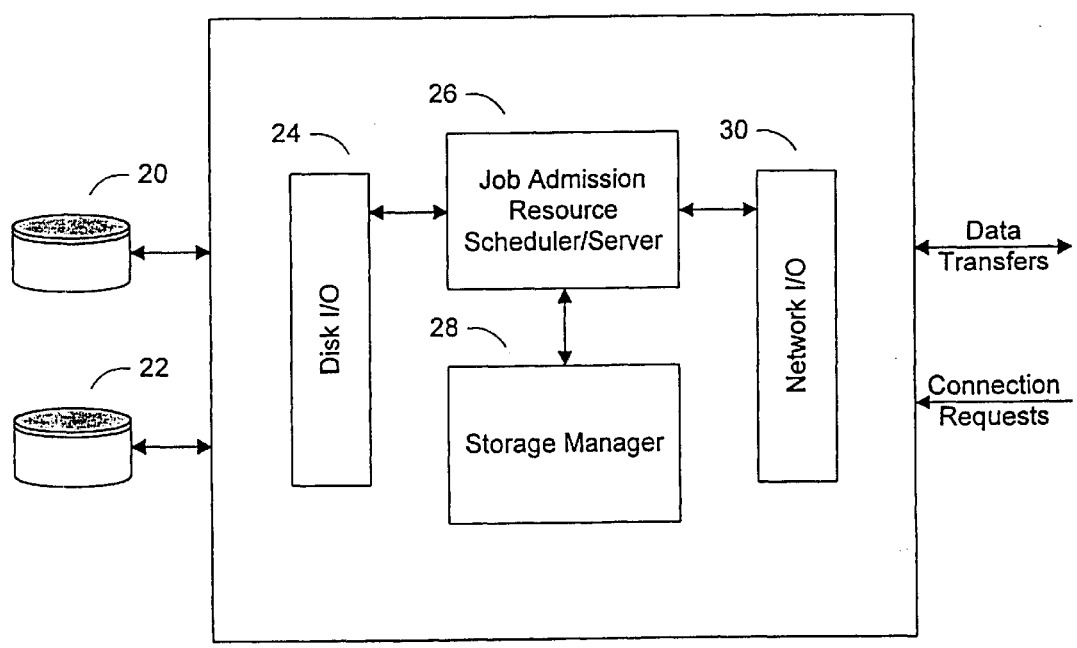
FIG. 1 illustrates a general configuration of the scheduler in a preferred embodiment of the present invention.

FIG. 1 illustrates, in a simplified manner, the general configuration of the preferred embodiment. Continuous media are stored on disks 20 and 22, and portions are buffered into memory as they are being accessed by user applications via the data transfers and connection requests. When a new job arrives and requests service, the job admission resource scheduler/server 26 generates one of three responses:

Trivial admit (The system is very underloaded and can provide the requested service);

Trivial reject (The system is very overloaded and service is refused); or

Conditional admit (Service will be attempted).

The guarantee given by admission is not unconditional good service. It is that the service to an admitted stream will not be degraded until all "less important" streams have first had their service cut off, where "less important" is defined by some importance ranking policy with respect to each application.

The server issues batches of disk transfers through the disk I/O 24 and network transfer requests through the network I/O 30 to the operating system to gain the benefits of disk scheduling and overlaps. This means the requests will complete in unpredictable orders. Cyclic scheduling is used to establish time frames that can be monitored to detect tardiness before jobs actually miss their deadlines.

For each cycle, the preferred embodiment performs relatively simple conservative resource modeling to grant bulk admission to this cycle for the most important jobs that can safely be predicted to complete on time as part of the server. During the cycle, the server does online tracking of actual resource consumption, and dynamically admits additional transfers to this cycle when possible. This maintains the inexpensive cost of simple modeling, while achieving a good utilization by dynamically filling slack regained from conservative estimates by the early completion of transfers.

The server does not actively manage CPU cycles. It runs in a real time process class so the continuous media service can prevent other jobs (that are not as time-sensitive) from starving the continuous media streams for CPU cycles. Given this, the system bottleneck is then normally somewhere in the disk, network, or memory subsystems.

The preferred embodiment of the present invention does not depend on a balanced architecture. The resource scheduling dynamically adjusts to the bottleneck resource, whether that be a disk, disk controller, network interface, or the memory subsystem. Consider, for example, a fast workstation with Ethernet versus one with a gigabit ATM network.

The network is not required to support bandwidth reservations, but if they are available, then the system efficiency will increase because more streams will be granted bulk admission to a cycle, and fewer will be served by absorbing slack dynamically freed during the schedule. In addition, clients obtain better assurance of high service quality because the hazard of network bandwidth shortages has been eliminated. For non-reservation networks like Ethernet, the clients will experience degradation if the network bandwidth goes away.

If the system is not totally isochronous so it can be perfectly scheduled, or if scheduling is not maximally conservative, then there will be overloads. Consider, for example, variable bit rate compressed video, or scripted presentations that have peaky bandwidth demands. Given that the user interface provides VCR functions, including pause, fast forward, and rewind, a subsequent user can cause the peaks to coincide in the worst possible way.

Numerous techniques have been proposed for load shedding. Some systems serve three classes of clients, i.e. continuous media, interactive response, and background, the latter two have their service rate reduced to save resources for continuous media. Others suppose that some streams are pre-identified as degradable, i.e. able to cope with reduction of bandwidth, and their system degrades these streams first, based on measures of how loss tolerant each client is, spreading the degradation proportional to loss tolerance.

Still other proposals for load shedding include the use of scalable digital coding and service degradation by reducing resolution by deferral of processing for requests that the application has indicated that are less important and the reduction of bandwidth by reducing resolution or frame rate.

In actuality, these are policies, so the server has no business selecting which of these techniques to apply. If a stream is missing its deadlines because of system overload, an application-selected policy should be applied to that stream. The server just provides the mechanisms.

A strategy of degrading service to cope with overload is perceptually significant, because slight degradation of the streams won't yield significant resource savings. For example, if the server disk subsystem is the bottleneck, dropping 10% of the streams will shed 10% of the load, but dropping 10% of the frames in all streams sheds much less than 10% of the load because disk seek overhead becomes relatively higher. Omitting a few frames from the middle of a whole track read may result in no mitigation of overload whatsoever.

The conventional admission control assumption leads to policies that accept new clients for service, even if this means degrading the quality of service provided to existing clients, up to some threshold beyond which new clients are refused. By contrast, the admission control of the preferred embodiment does not predict the degradation that would result from admitting the next client, because clients are admitted subject to the condition that any degradation required to handle a resulting overload will be focused on the least important streams. In particular, the present invention provides a mechanism to protect a subset of the streams, and uses a prioritization policy that explicitly chooses which streams to protect and which others to degrade. Any policy can be used that gives a rank ordering over all the streams. A simple policy that appears useful for the server is to protect the oldest streams, degrading the newest. Thus streams that have been running for a long time will tend to be protected from degradation, while streams that recently started may be interrupted if it turns out that there really isn't sufficient capacity to serve them. A new client who requests service can quickly see whether the quality of service is satisfactory and decide whether to continue or quit. Thus resource insufficiency is focused on unsupportable newly added load, stimulating client driven load shedding. Furthermore, a client can state how it would like be degraded, e.g. lower frame rate or resolution, if it would otherwise be suspended because of resource insufficiency. Note that this has been a discussion of load shedding policy, i.e. who to degrade during overload, not how conservative to make admission control to set the tradeoff between system utilization and probability of degradation.

Consider composite streams such as video with audio, or scripted presentations consisting of a time-related collection of continuous media streams and discrete data objects such as images that will be synchronized at the client for joint presentation. From a human factors standpoint, loss of audio is a much greater failure than loss of video. Therefore, scheduling should consider more than a frame's intended presentation time. In systems that can't provide hard real-time guarantees, it will send small, valuable frames well ahead of time, and buffer them on the client side. This can be hidden in the client-side libraries that handle composite audio-video streams by pre-fetching audio data to the client buffer far in advance. Transfer scheduling to the client is distinct from presentation scheduling at the client.

The server of the preferred embodiment aggressively degrades some streams in exchange for better protection of others. For example, in the case of a newly arriving job, the server can boost the priority of some components while antiboosting the priority of others, provided (a) that the bandwidth-weighted average priority does not increase and (b) it doesn't injure established streams unless these streams have antiboost priority. This way, a stream is only permitted to boost if it does not cause an overload, or causes an overload that only degrades antiboosted streams.

It may be necessary to prevent boosting the priority of a scripted component now in exchange for hurting another component in the future, otherwise it could cheat by appending dummy components to the end of a script, boosting to get good service now in exchange for degradation of the dummy portion that won't really be used anyway. Two ways to handle this are (1) an economic solution: charge for the entire composite, including dummy portions, or (2) pre-verification or policing of the entire schedule: during no cycle does the bandwidth-weighted boost exceed the antiboost. Similarly, it may be necessary to prevent padding of composite streams with dummy streams that exist only to be degraded. Two ways to handle this are (1) economic: charge for the entire composite including dummy portions, or (2) discriminate against higher bandwidth jobs so that adding a dummy stream and degrading it maximally, boosts the remaining streams only to the priority they would have obtained had the dummy stream not been a member of the composite in the first place.

The overall approach of favoring older streams encourages a client to improve its priority by opening a stream hours ahead of time, but not starting the actual data transfer until much later, at which point it could have amassed sufficient priority to displace clients that had been running smoothly for the past tens of minutes.

In the ensuing discussion, the following terminology is used:

Cyclic scheduling: a periodic activity that, given the service desired by each job for each time period, schedules the necessary operations based on estimates of the server's capacity for each resource and the estimated resource demands of each job. Good estimates can improve server efficiency, but the algorithms will dynamically compensate for overconservative estimates as actual resource utilization is observed.

Cycle fault: occurs when some activities that are scheduled for a time period have not completed by the end of that cycle. These unfinished activities are terminated or rescheduled according to their job's disposition policy.

Estimated server slack: with respect to a resource and a cycle, is the amount by which the estimated server capacity exceeds the estimated job demands.

Figure 2:
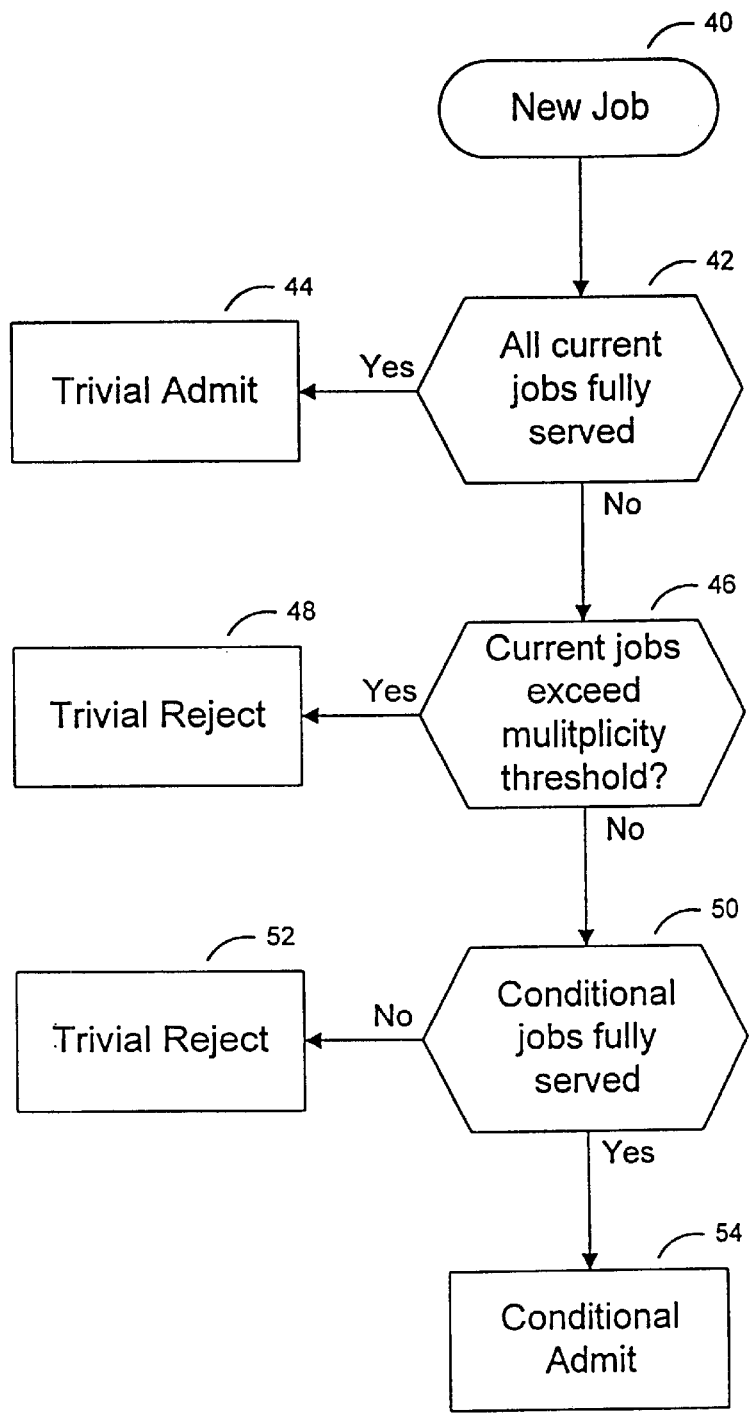
FIG. 2 illustrates a flow of the overall approach of the present invention.

As shown in FIG. 2, when a new request arrives 40, job admission is performed. Note that it is necessary to treat the job, which may be a composite stream or scripted presentation, as the unit of admission and priority. It would not be satisfactory to degrade a scripted presentation late in its show just because it closes one file and opens another, therefore giving the appearance of starting a very young continuous media strand.

The goal of job admission is quick rejection of new jobs when the server is clearly in a state of heavy overload. Otherwise a job is conditionally admitted and the cyclic scheduling will attempt to ensure that the job receives service only if sufficient server capacity actually is available. This strategy differs from the more common approach, in which systems must predict resource demands and capacity very accurately and reject a job if the server actually would not be able to serve it. Because of the robustness of the present invention's cyclic scheduling, a simple algorithm is sufficient for job admission.

Given the lightly loaded resource threshold parameter, $X_R$, the job multiplicity threshold parameter, Y, and the resource insufficiency threshold parameter Z, a job J is tested for admission as follows:

If all current jobs are being served 42 without cycle faults and the estimated resource consumption for J is less than $X_R\%$ of the estimated server slack for each resource R, then Trivial Admit 44;

Else if the current number of admitted jobs exceeds Y 46, then Trivial Reject 48;

Else if some conditionally admitted jobs currently are not being served because of resource insufficiency for resource R 50, and the sum of their estimated resource demands for R plus the estimated demand for R by the new job J exceeds the estimated server capacity by a factor of Z %, then Trivial Reject 52.

Else Conditional Admit 54.

The threshold parameters $X_R$, Y, and Z need empirical determination. X=25% and Z=100% are reasonable starting values. Y is set low enough that scheduling and disposition processing, which are linear in the number of jobs, do not dominate the scheduling cycle.

The admission algorithm can be modified in an alternate embodiment, if it is desirable to have a class of jobs that are permitted to barge into the server and displace currently running jobs. In that case "trivial reject" would be replaced with "repeatedly remove from the system the least important job until the current job can be conditionally admitted".

An admitted job is assigned to the first cycle during which it has service requests. The job's data transfer requests for the cycle are inserted into a priority queue for that cycle, ordered by the prioritization policy. For example purposes, this discussion uses the prioritization policy discussed earlier, i.e. an older job has higher priority than a younger job, and the priority of a continuous media stream belonging to a job is equal to the priority of the job plus any boosting or antiboosting. When the transfer for a job completes or is disposed of at cycle end, the job is assigned to the next period during which it has service requests.

The scheduler needs to know at the beginning of a cycle how much data is requested, and from which disks. The transfers requested by a job are conveyed to the server by a stream description or script that identifies the specific data frames needed and the times at which they are needed. This encompasses a variety of styles of client interaction, ranging from client driven frame-by-frame read operations to server-driven periodic data transmission subject to client commands such as pause, fast-forward, or rewind. Among the ways to provide this information are a frame index and desired frame rate; a file name and frame rate for a data format known to the server, such as Motion JPEG or MPEG; or a specification that reserves bandwidth from a particular disk, and a sequence of read requests (offset and length) that arrive in a timely fashion so the server can retrieve the data during the scheduled time frame.

One property of the interface to note is that the application is not requested to state how much of various resources in various categories it needs to obtain its desired quality of service. It just states frames per second and identifies the data to be played. It is the server's responsibility to assess resource demands and determine whether the server can handle it.

Each stream that requires frames during a cycle is scheduled for one transfer during the cycle. The cycle length is set to balance a tradeoff. On one hand, a short cycle improves the response time of new streams starting up. On the other hand, a long cycle improves system efficiency because overheads are amortized over larger transfers, although the total required buffer space grows with increasing cycle length. For the continuous media transfers of the present invention, the space requirement is directly related to the cycle length because one cycle's volume of data is buffered between disk and network.

For example, take the average data rate of a stream as R, and w as the percent of the disk resource that is to be wasted on access time overhead. For a disk whose transfer rate is $r_d$, let $t_a$ and $t_t$ be the expected average access and transfer time, respectively.

This implies:

$$t_a \leq w \times (t_a + t_t) \Rightarrow t_t \geq \frac{1-w}{w} \times t_a$$

For an average transfer size of B bytes, $t_t \times r_d = B$. But within a cycle of length T, B=T×R bytes can be transferred. Therefore, T×R=$t_t \times r_d$ and:

$$T = \frac{t_t \times r_d}{R}$$

Leading to:

$$T \geq \frac{(1-w) \times t_a \times r_d}{w \times R}$$

In order to waste less than w=50% of the disk on access time overhead, the cycle length needs to be set:

$$T \geq \frac{t_a \times r_d}{R}$$

For example, consider a SCSI disk with 20 ms. average access time and 3.4 MB/s disk transfer rate, playing MPEG video streams having an average bandwidth of 1.12 megabits per second. Then the cycle period should be ½ sec or more.

Any fast subsystem can use the idle time at the end of the cycle to work ahead, bounded by the buffer space allocated to each stream. For example, it is desirable for the disk subsystem to buffer ahead by 1 second to provide robustness in the face of rare disk delays such as seek retries (typically, 20 ms.) or recalibration cycles (typically ¾ sec.).

Issuing multiple concurrent disk reads to a single disk enables the operating system's disk scheduling to improve the average access time, which supports a shorter cycle period. By allocating disk space in track-sized blocks, transfers scheduled by known methods are so efficient that constrained placement of data on disk becomes unimportant.

The cycle length is directly related to the latency of starting a new stream. If the network and disk cycle times are ½ second, the maximum server-induced latency for successful startup of a new job is 1 second. This is tolerable from a human factors standpoint. For one-time transfers (e.g. image retrieval) the delay implied by a long cycle may be an issue from a human factors standpoint. For instance, if a user is interactively traversing hypermedia links, latency less than 200 milliseconds would be more suitable. The real-time sporadic server research and slack stealing approach suggest moving one-time jobs ahead in the schedule, slack permitting, and suggests the insertion of rescheduling points within the cycle to reduce startup latency.

The maximum read size is bounded by the bandwidth per cycle. If reads are large by comparison with the cycle length, utilization will suffer because a large slack must accumulate before an additional read can fit into the schedule. A compensating technique is to utilize idle slack at the end of each cycle by starting the next cycle early to work ahead. In this case, a limitation on buffer space per stream will bound how far ahead that stream is fetched. Fragmenting requests into smaller pieces can improve schedulability, but adds overhead.

Figure 3:
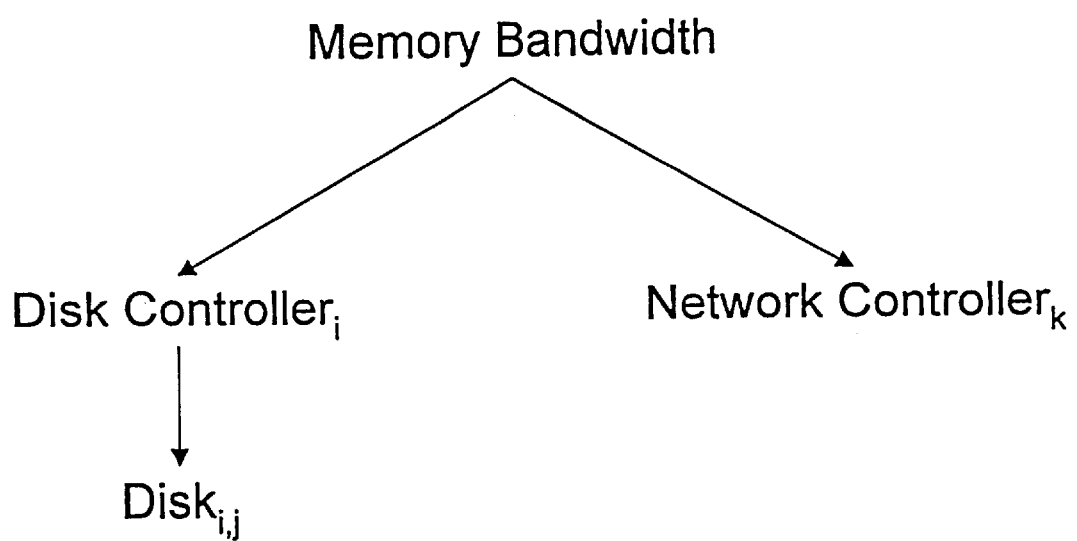
FIG. 3 shows a typical resource tree of the present invention.

At the beginning of a cycle, the transfer requests in the queue are processed by hierarchical resource scheduling. The resource hierarchy consists of the memory bandwidth, the bandwidth for each disk controller and network controller, and each disk drive's bandwidth, forming the resource tree depicted in FIG. 3.

Hierarchical resource scheduling for a cycle is a culling out process. First the memory bandwidth is checked, and the lowest priority transfer requests are removed until the total bandwidth demand is within the resource limit. The list of transfer requests passing this filter is split into lists for each disk controller and network interface. These lists are filtered by the respective bandwidths of those busses and controllers. Then the list for a disk controller is split into lists for each disk, which are again culled out based on a conservative estimate of the disk access and transfer times for each request. Transfers that have not been culled out by the above process are said to have been admitted to the current cycle. These resource filters are conservative so that jobs not culled out will complete without cycle fault.

Other important resources are CPU cycles, buffer space, and disk space. As discussed previously, the CPU is assumed not to be the bottleneck, so beyond the use of a real-time priority class for continuous media processes, no CPU management is performed. Buffer space management is by allocating a pool per stream, granted at job admission (not cycle admission). Disk space is allocated at job admission for jobs that perform recording. Bandwidth for any streams that are recording must be obtained from the scheduler. Resources must also be reserved to handle control messages from the clients so that streams are suitably responsive to commands such as skip, pause, abort, etc. Additional time in the cycle, proportional to the number of items in that cycle's job queue, is reserved for scheduling and disposition processing.

For simplicity, the preferred embodiment is presented as if each job has only one stream. Multiple streams for one job are scheduled independently during a cycle, but they are treated as a single entity at the end of the cycle for disposition and scheduling of the next cycle's transfers.

The method to schedule jobs at the beginning of a cycle is described in terms of resource consumption functions. This generates admit list or wait queue entries on all resources for all jobs that want service during this cycle. For a cycle of length T, the initial batch of k admitted jobs has the property that the time predicted by all resource consumption functions to serve all k jobs is less than T.

For job J, the consumption functions are denoted $C_R(J, L_R)$, where resource R is one of the following: memory read bandwidth (memr), memory write bandwidth (memw), a network controller's bandwidth (n), a disk controller's bandwidth (c), or a disk's bandwidth (d). $L_R$ is a list of jobs already admitted to this cycle for resource R. A consumption function returns a conservative estimate (upper bound) of the incremental time added by job J to a list of jobs LR previously admitted to the resource R in a given cycle. Define $C_R(nil, L_R)$ to be the total estimated time for all jobs in $L_R$ and $C_R(J, empty)$, to be the time estimated for job J alone. The resource consumption functions must be conservative so that the algorithm only admits jobs that can in fact be served by that resource during the cycle. To make the equations operate correctly, $C_R(J, L_R)$ should be commutative and monotonic with respect to $L_R$.

Figure 4:
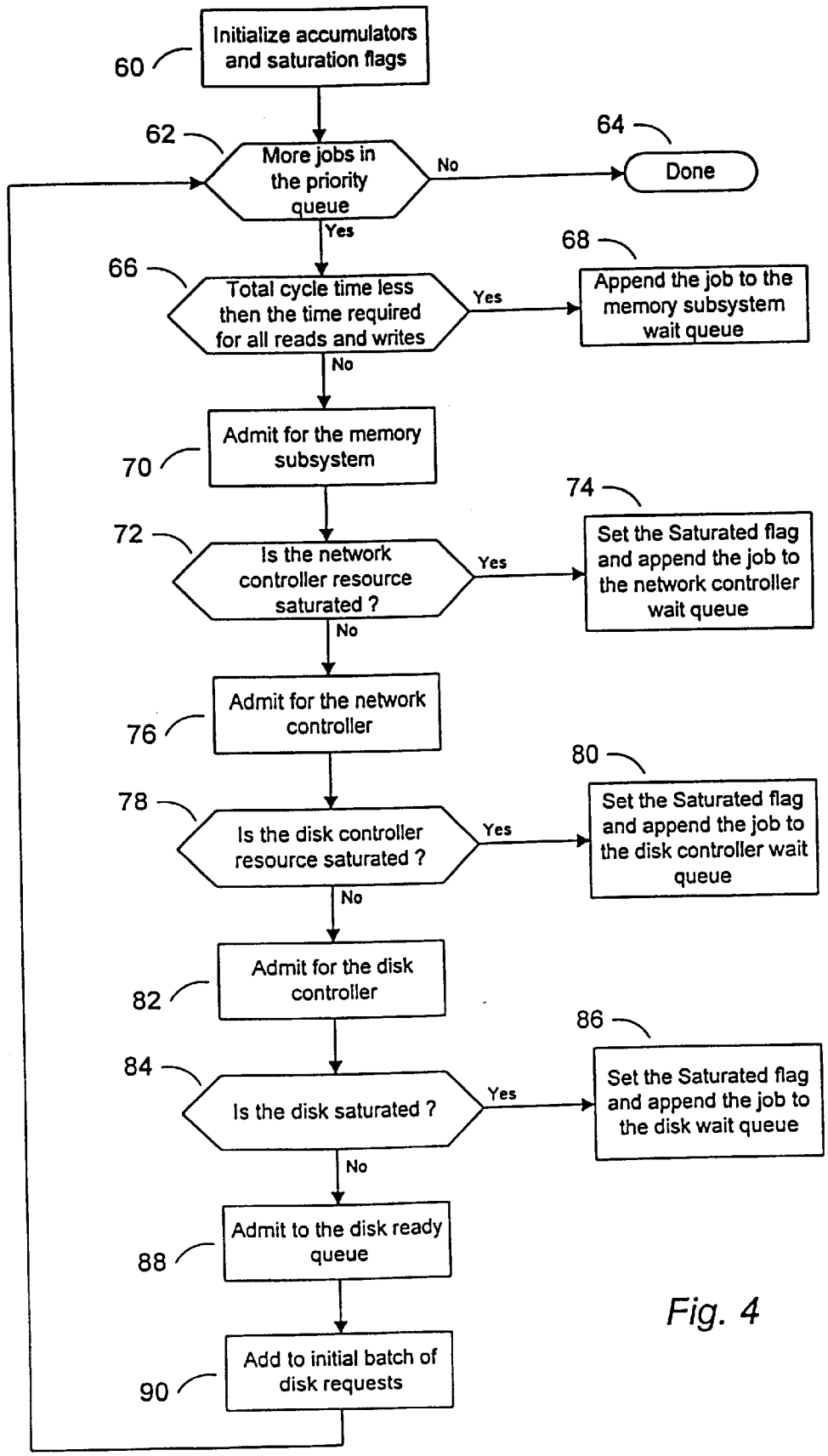
FIG. 4 shows a typical flow of job scheduling in the present invention.

The following description as depicted in FIG. 4, involves cycle time accumulators denoted Admitted$_R$ for each resource R listed above, except memory read and write are aggregated into one resource, denoted mem. The accumulators contain the total estimated time of jobs admitted to each resource for this cycle. A resource saturation flag, denoted Saturated$_R$, becomes TRUE when the algorithm refuses admission to that resource for a job request this cycle.

1. Initialize all the cycle time accumulators to 0 and all the saturation flags to FALSE 60.
2. For each job J in the priority queue of jobs for this cycle 62, 64 in decreasing order of importance, do the following steps: Let n denote the network controller that will transmit the data for job J c denote the disk controller that will retrieve the data for job J d denote the disk that will retrieve the data for job J.
   (a) Let $M=C_{memw}(J, L_{memw})+C_{memr}(J, L_{memr})$. If T-Admitted$_{mem}$<M 66 then append job J to the wait queue for the memory subsystem 68, otherwise job J is admitted for the memory subsystem 70: Admitted$_{mem}$+=M; $L_{memr}$+=J; $L_{memw}$+=J.
   (b) If Saturated$_n$ or if T-Admitted$_n$<$C_n(J, L_n)$ 72 then set Saturated$_n$=TRUE and append job J to the wait queue for network controller n 74, otherwise job J is admitted for network controller n 76: Admitted$_n$+=$C_n(J, L_n)$; $L_n$+=J.
   (c) If Saturated$_c$ or if T-Admitted$_c$<$C_c(J, L_c)$ 78 then set Saturated$_c$=TRUE and append job J to the wait queue for disk controller c 80, otherwise job J is admitted for disk controller c 82: Admitted$_c$+=$C_c(J, L_c)$; $L_c$+=J.
   (d) If Saturated$_d$ or if T-Admitted$_d$<$C_d(J, L_d)$ 84 then set Saturated$_d$=TRUE and append job J to the wait queue for disk d 86, otherwise job J is admitted to the ready queue for disk d 88: Admitted$_d$+=$C_d(J, L_d)$; $L_d$+=J.
   (e) If job J has been admitted for memory, disk controller, and disk, then add it to the initial batch of disk requests 90.

Note that all resources for a job are reserved (or an entry is put on appropriate wait queue) before the next less important job is considered. This is to maintain the property that a less important job will not be handled if a more important one could have been. It is quite possible that a job that cannot fit in the initial batch of disk requests will subsequently be able to be scheduled into disk slack time during the execution of the cycle. Therefore the scheduling is designed to prevent less important jobs from saturating the schedule for the network or memory subsystems.

When the cycle begins, all the disk requests in the initial batch are issued to the operating system. There is a tradeoff involving the number of outstanding disk I/Os in the kernel. More outstanding I/Os should produce a more efficient schedule, but it incurs a loss of control over the response time to any particular request. The initial batch size is the largest that can be reliably predicted by the resource consumption functions to complete all its transfers in time to meet the application deadlines.

Given large transfers, the disk bus and controller may be more of a bottleneck than the disks. For instance, a SCSI bus can handle seven or more devices, but a SCSI bus and controller typically saturate at the bandwidth of two fast disks performing large transfers. So this may make it unnecessary to have a good disk model; the bottleneck may be the SCSI controller.

As a first cut at simple consumption functions, the simple linear approximation $C_R(J, L_R)$=bytes(J)÷bandwidth$_R$+overhead$_R$ is used. Conservative values for the bandwidths and overheads for a particular system can be determined by running small programs that exercise and measure the resources. In particular, the sustained transfer bandwidth as a function of the number of bytes is measured, and the overhead for memory is 0, the overhead for a disk controller is the response time of a 1-byte read that hits in the on-disk track cache, the overhead for a network is the time to read or write a 1-byte message, and the overhead for a disk is the full stroke seek plus maximum rotational latency.

Transfers that are not admitted at the beginning of a cycle may still be served during that cycle. When a disk or net transfer finishes, the actual resource consumption, based on completion time, is compared with the predictions at each level of the resource hierarchy. Since the predictions are conservative, the actual times should be smaller. In this case slack time has been released, so the highest priority transfer that has not yet been admitted is checked to see whether it can now be admitted to the current cycle. This process is termed "slack filling".

Conservative admission at the beginning of a cycle, coupled with slack filling to serve additional streams, automatically provides robustness. If streams start slipping their schedules for any reason, whether the fault of the server or a result of some external trouble, less slack will become available during the cycle, effectively degrading the "least worthy" streams (according to the prioritization policy as discussed above) to preserve proper service to as many streams as can be handled by the available resources. As an example, ideally, a 10% loss of resources on a fully loaded machine would only impact 10% of the clients; the other 90% would be unaware of the problem. Furthermore, effective streams are selected for degradation. The shortage of slack from a particular resource, e.g. an overloaded disk drive, will block the least important transfers that use that resource, without impairing transfers that are independent of that resource. The more specific and accurate the resource models are, the better the confinement of effects of resource shortages. This protection works even if job admission erroneously admits more jobs than can be served within the resource bounds.

Because of the slack filling during the disk and network cycles, potential cycle overruns can be detected before transfers are actually late. At the start of a cycle, the jobs not in the initial batch are at risk of missing their deadlines. Jobs further down the wait list are at greater risk, quantified by the bandwidth requirement stated in each job's descriptor. Compensating mechanisms can engage before any stream degradation is observed at the client side. This straightforward support for performance surveillance is a valuable feature. In a highly unpredictable environment another step is taken as an enhancement to the preferred embodiment. The progress of transfers during the cycle is monitored and if a severe lack of progress is observed, victims are chosen to be aborted from among the least important transfers already in progress.

The slack-filling technique is described in the context of copy through memory architectures (the server reads from disk to buffer, sends from buffer to network). It will also work with network-attached disks and desk area network organizations that use high bandwidth networking such as a fibre channel, and that may support bandwidth allocation. If the network is not a bottleneck, transfer scheduling is unnecessary for the network side. The server schedules the disk I/Os and data from disk is immediately dumped through the network channel to the client.

During a cycle, whenever a disk read finishes, the filled data buffer is handed off to the network manager for transmission in accordance with the network schedule. The network manager can dynamically estimate the desired bandwidth associated with this buffer as the ratio of buffer size to remaining time in this network cycle. The difference between the conservative predicted disk read time and the actual completion time is additional slack that can be released to the disk, disk controller, and memory write schedules. Given additional slack, each resource attempts to admit additional high priority jobs from the resource wait queue. If a job becomes admitted to disk, disk controller, memory read, and memory write, its disk request is issued to the operating system.

The method to calculate the slack that is freed in one disk's schedule by the completion of a read uses four variables:

Admitted: The list of requests for this disk that have been admitted to this cycle;

Completed: The list of requests for this disk that have completed this cycle;

Slack: The accumulated available slack for this cycle; and

Prev_done: The time at which the previous request completed.

At the start of a cycle, the variables are initialized to:

Admitted=$L_d$

Completed=empty

Slack=T−$C_d$(nil, Admitted)

Prev_done=current_time

When the request for job J completes, the following steps are performed:

1. Calculate the slack released by this job and update the variables. The slack is the time it was predicted to add to the partial schedule, minus the time it actually added.
    (a) Slack+=$C_d$(J, Completed)−(current_time−Prev_done)
    (b) Prev_done=current_time
    (c) Completed=Completed+J
2. Check admission for the highest priority job J' in the disk's wait queue. If $C_d$(J', Admitted)<=Slack then
    (a) Slack−=$C_d$(J', Admited)
    (b) Admitted+=J'
    (c) If J' is not on wait lists for disk controller or memory then issue the disk read to the operating system.
    (d) Iterate step 2 to check the next highest priority job.

When the disk cycle finishes early because all the transfers have completed, the next cycle is scheduled without delay. The new cycle now has extra time by starting immediately but ending at the proper time to maintain the correct pacing of the periodic schedule. Although the cycle can start early, the amount of work ahead is constrained by buffer limits. With respect to network work ahead, ready buffers that belong to future cycles have lower network scheduling priority than any buffer belonging to this cycle. This prevents work ahead from preempting the slack backfilling that enlarges the number of streams the server can concurrently sustain. In essence, the network doesn't work ahead, although as with the disk, the network may start its next cycle prematurely if it runs out of work for the current cycle.

The network controller has a priority queue of transfers for this cycle. This cycle has the same duration as the disk cycle, but is phase shifted. The minimum phase shift is the time actually needed to complete the first disk read for this cycle. The maximum phase shift is the full cycle duration. This is what it takes to finish all disk reads then hand them over as a complete batch to the network scheduler. A small phase difference implies a small server query/response latency, but a large phase difference is good for network bandwidth because a larger number of buffers are available for concurrent transmission, so many channels can be serviced between calls. If the first buffer for a cycle arrives late, the phase difference is increased to allow a full cycle period for the network transmissions. If a network cycle finishes all its scheduled transmissions before the deadline, and if a buffer for the next network cycle is available for transmission, the phase difference will be decreased, but only by a small amount. That is, transmission for the next network cycle will commence immediately to avoid wasting network bandwidth, but the end time of the next network cycle will only be advanced by a small amount to protect the network bandwidth.

Because the disk and network cycles don't exactly coincide, the simple memory bandwidth check described earlier may need refinement in an alternate embodiment. This is unimportant if the memory bandwidth is not the system bottleneck, or if the load from cycle to cycle is relatively constant so coincident load on the memory from the previous network cycle and the current overlapping disk cycle doesn't exceed the memory bandwidth. If the network is relatively fast then, on a server with copy-through-memory architecture having many disks, the memory bandwidth will likely be a bottleneck. In this case it will be necessary to schedule and allocate memory bandwidth each time a new network or disk cycle begins, by reserving a portion for system overhead and allocating the remainder to serve the network and disk traffic, favoring whichever of the two is more of a system bottleneck.

Disk throughput has been improved by issuing an "initial batch" of requests to a disk so I/O scheduling in the operating system could reduce the seek overhead. An analogous technique applies to network transmission from server to client. The "initial batch" of k jobs from the priority queue is the largest set of most important jobs that have aggregate bandwidth less than X % of the recent observed network bandwidth, where X is a tunable parameter set to 100% for reservation networks, and less than 100% to provide a safety factor for networks such as Ethernet that can suffer sudden loss of bandwidth because of congestion.

The network "inner loop" is (1) determine the set of communication channels that can accept an asynchronous write without blocking, and (2) if any job in the initial batch can accept an asynchronous write without blocking then do an asynchronous write for every such job in the initial batch, else do an asynchronous write for the first such job in the priority queue. But a write is initiated only if, based on recently observed network bandwidth, it is predicted that (1) the write will complete by the end time of this network cycle, and (2) if the write is not from the initial batch, it will leave enough bandwidth in the cycle to transmit the remaining data for the initial batch.

Slack freeing when a network transfer completes is similar to that described in the disk case above. Slack is freed down the resource tree, admitting additional jobs from resource wait lists when possible. If a job becomes admitted everywhere, issue its disk request to the operating system. When a job completes all its network transfers for a cycle, if the job has transfers for any future cycles, it is placed into the job queue of the nearest such cycle.

As described above, the initial batch of jobs for concurrent service at the beginning of a network cycle is the first k jobs on the priority queue, such that their aggregate bandwidth demand is safely within the available network bandwidth. For networks like Ethernet that can suffer sudden and prolonged loss of bandwidth, it may be necessary to initially focus on a smaller number of the most important jobs, and only start to serve others as it becomes increasingly likely that the first jobs will finish before the cycle end. In such a case, it is desirable to derate k, and then start serving additional jobs as the first k make progress, but before any of the first k completes. In this case, k is an adaptive function of the following four parameters:

1. The bandwidth required to complete the transmission of the initial batch by the end of this cycle.
2. The recent observed network throughput.
3. The derating factor that reduces to an acceptable level the potential impact of future bandwidth loss, should it occur during the remainder of the cycle.
4. The amount of time remaining in the cycle.

A disk or network cycle is terminated when all outstanding jobs have completed, and the slack is insufficient to issue the next job in the priority queue; or the duration of the cycle time has been reached.

The scheduling is intended to prevent the second case from occurring. If it should happen anyway, e.g. if a disk goes into a recalibration cycle for ¾ seconds, so transfers that were issued have not completed by cycle end, then the disposition policies are applied to all transfers that did not complete.

To support the canceling of asynchronous network transmissions, the bulk data of a transmission is fragmented. Each fixed-length fragment has a small header that conveys indications to the client such as abandon the current in-progress transfer, or this transfer is slipping and will finish later than scheduled. Because some asynchronous mechanisms, e.g. in UNIX, will complete a read or write with a partial packet, it is possible to request the transmission of a large block with scatter/gather to insert small fragment headers indicating proper completion, and between asynchronous reads/writes change plans and alter the next fragment header to indicate a drop or slip. This obtains the approximate throughput of large block transmissions in the normal case, but short latency that is proportional to the fragment size, in case of abandonment.

Canceling of in-progress transfers may also be needed if the prioritization policy contains a category of high priority jobs that are permitted to barge in during a cycle, displacing some currently scheduled and running transfers.

Each job that has not completed at the end of the cycle, i.e., remains on a wait queue or is canceled while in progress, has its disposition policy applied. Examples of disposition policies include:

Pause the schedule and just slip the entire transfer schedule for this stream into the future.

Try to catch up by transmitting both this cycle's and the next cycle's frames during the next cycle.

Drop frames to maintain the presentation time schedule.

Reduce the frame rate to maintain the presentation time schedule.

Reduce the frame resolution to maintain the presentation time schedule.

Kill the job, which stated that it is unwilling to adapt to resource reduction.

The disposition policy for a stream can change. For example, a stream having the "drop frames" policy during normal display may change to "pause the schedule" if the application does the "pause" VCR operation. Then the server and client buffers for that stream can continue to fill up as work ahead, until buffer limits apply back pressure.

Although the subject invention has been described with respect to preferred embodiments, it will be readily apparent to those having ordinary skill in the art to which it appertains that changes and modifications may be made thereto without departing from the spirit or scope of the subject invention as defined by the appended claims.

What is claimed is:

1. A method of playing back continuous media data comprising the steps of:

performing job admission based on loading of a server;

performing hierarchically scheduling of a plurality of resources based on an estimate of consumption of a plurality of data streams from each of said plurality of resources with respect to available time during a single schedule cycle of a plurality of schedule cycles substantially ensuring completion of at least one of said plurality of data streams within a particular time frame of said single schedule cycle;

dynamically monitoring actual resource consumption to improve utilization of said plurality of resources with conservative admission at beginning of said single cycle and slack filling additional available time during said particular time frame of said single cycle;

degrading a first part of one of said plurality of data streams with respect to a second part of one of said plurality of data streams deemed less important according to an application specified prioritization policy of said server.

2. The method of claim 1 wherein said job admission further comprises the steps of:

trivially admitting said at least one of said plurality of data streams when said server is underloaded;

trivially rejecting said at least one of said plurality of data streams when said server is overloaded; and conditionally admitting said at least one of said plurality of data streams when said server is in a normal load condition.

3. The method of claim 1 wherein said hierarchial scheduling further comprises the step of generating a first batch of data streams from said plurality of data streams that are to complete within said time frame of said single schedule cycle.

4. The method of claim 3 wherein said hierarchial scheduling further comprises the step of generating a plurality of waiting queues on said resources of said plurality of data streams that are not members of said first batch of data streams.

5. The method of claim 4 wherein said improving utilization of said plurality of resources by slack filling further comprises the steps of comparing actual resource consumption with predictions of said hierarchical resource scheduling and conditionally admitting a second batch of data streams from said plurality of waiting queues when said actual resource consumption is smaller.

6. The method of claim 2 wherein the step of trivially admitting said at least one data stream further comprises the steps of estimating the resource consumption and determining that said at least one data stream will fit within said slack.

7. The method of claim 1 wherein said plurality of resources includes a memory subsystem.

8. The method of claim 1 wherein said plurality of resources includes a network controller.

9. The method of claim 1 wherein said plurality of resources includes a disk controller.

10. The method of claim 1 wherein said plurality of resources includes a disk.

11. The method of claim 1 wherein said performing hierarchical scheduling is done based on a plurality of network and disk cycles.

12. The method of claim 11 wherein said plurality of cycles includes a first cycle and a second cycle, said second cycle having extra time when said first cycle finishes early.

13. The method of claim 1 wherein said specified prioritization policy increases protection from degradation of said at least one of said plurality of data streams in proportion to said plurality of schedule cycles of which said at least one of said plurality of data streams has been served.

14. A method of playing back continuous media comprising the steps of:

performing hierarchical scheduling of a plurality of resources based on estimating the resource consumption and determining that at least one data stream will fit within a schedule cycle among a collection of data streams for each of said plurality of resources;

dynamically monitoring actual resource consumption to improve utilization of said plurality of resources with conservative admission at beginning of said single cycle and by comparing actual resource consumption with predictions of hierarchical resource scheduling and serving additional data streams from said collection of data streams from a plurality of waiting queues when said actual resource consumption is smaller as a means of slack filling any available time during said schedule cycle; and degrading parts of said at least one data stream deemed less important than remaining data streams of said collection of data streams according to an application specified prioritization policy.

15. An apparatus to play back continuous media comprising:

schedule means for performing hierarchical scheduling of a plurality of resources based on estimating resource consumption for determining that at least one data stream will fit within a schedule cycle of a plurality of schedule cycles among a collection of data streams for each of said plurality of resources;

means for dynamically monitoring actual resource consumption to improve utilization of said plurality of resources with conservative admission at beginning of said single cycle and for comparing actual resource consumption with predictions of hierarchical resource scheduling and serving additional data streams from said collection of data streams from a plurality of waiting queues when said actual resource consumption is smaller as a means of slack filling any available time during said schedule cycle; and degrading means for degrading parts of said at least one data stream not fully served and deemed less important than remaining data streams of said collection of data streams according to an application specified prioritization policy.

16. The apparatus of claim 15 wherein said specified prioritization policy increases protection from degradation of said at least one data stream in proportion to said plurality of schedule cycles of which said at least one data stream has been served.

* * * * *